(No Model.)
F. GRANT.
WHIP.
No. 448,650. Patented Mar. 24, 1891.
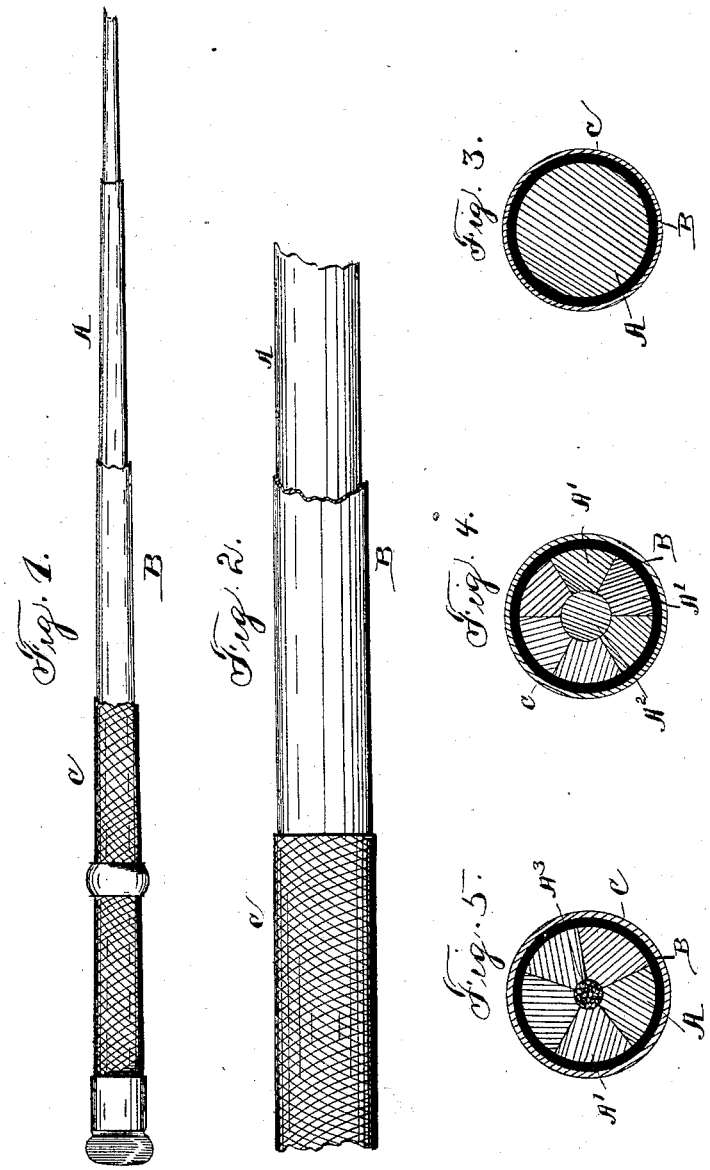
Witness
O. W. Johnson.
F. B. Brock
Frank Grant, Inventor
By W. A. Bartlett, Atty

UNITED STATES PATENT OFFICE.

FRANK GRANT, OF WESTFIELD, MASSACHUSETTS.

WHIP.

SPECIFICATION forming part of Letters Patent No. 448,650, dated March 24, 1891.

Application filed September 19, 1890. Serial No. 365,458. (No model.)

*To all whom it may concern:*

Be it known that I, FRANK GRANT, residing at Westfield, in the county of Hampden and State of Massachusetts, have invented certain new and useful Improvements in Whips, of which the following is a specification, reference being had therein to the accompanying drawings.

This invention relates to whips.

The object of the invention is to produce a whip in which the core shall be protected by a water-proof and flexible covering, which covering shall be firmly attached to the core or central part of the whip.

Figure 1 is a side elevation of a whip, with parts broken away to show the construction. Fig. 2 is a similar elevation of a part of the whip. Figs. 3, 4, and 5 are cross-sections showing the covering over cores of various kinds.

A indicates the core of a whip. This core may be made of a single piece of rattan, as in Figs. 2 and 3; or it may be of split rattan, as at A' A', Fig. 4, around a central strip A² of whalebone or other material; or it may be a core of other construction, an example being shown in Fig. 5.

B indicates a layer or covering of sheet-rubber. This rubber is cut from a smooth sheet, and is of such width as to exactly reach round the core without lap. The rubber may be cut by hand or by a machine I have devised, which cuts a strip from a sheet of rubber of just such width as to extend round the core, whether the core be of true conical form or irregular in its taper, as is generally the case.

C indicates a plaiting or braided covering, applied and painted or varnished as usual.

The core A is made in any suitable manner. In Fig. 5 a heart-piece A³ of metallic wires or fibers is indicated. This is surrounded by strips A' of split rattan; but whalebone or rawhide or other usual material may be used.

A tapered rattan core has the external fibers cut away toward the small end. If such a core be drawn through the hand, small end first, the ends of the fibers will be very perceptible.

I take the core A and coat it with a rubber cement. I then apply the rubber strip B and smooth it by hand until the edges of the strip exactly meet, but do not lap over each other. The cement holds the rubber sheet temporarily, and no fibers or other material intervenes between the rubber and the core. I vulcanize the rubber strips on the core, avoiding excess of heat to injure the core. After the rubber is vulcanized it will firmly adhere to the core, and the rubber cement becomes incorporated and vulcanized with the covering. The rubber penetrates the pores of the core for a little distance. I then braid or plait a covering of thread upon the whip. The adhesion of the vulcanized rubber to the core is such that the rubber layer will not roll up in ridges as the braiding progresses. Neither will the rubber by compression ooze through or between the meshes of the braid, as the rubber will be made firm by the vulcanization.

A rubber tube of conical form has heretofore been known as a cover for a whip-core. This has been objectionable for the reason that the glue applied to the core would slide along as the tube is drawn on the core, so that the gluing is necessarily unequal. As the tube must be drawn on the core from the small end, the fibers of the rattan core are turned up, producing a roughness under the rubber coating. The adhesion of such a glued tube is imperfect, and in applying the braid the rubber would be compressed by the braid and roll up in ridges ahead of the braiding until the limit of extension is reached, when the rubber forms a rib-like elevation, and the braid covers the rib, producing a rough or ridged surface. The rubber in these ridges, if not very hard, will be pressed through the meshes of the braid. The above is the demonstrated result of using a tubular rubber cover or lining over a rattan core.

A strip of gutta-percha has been described as wound spirally round a whip-core and held by glue or cement, with the edges overlapping. This produces a spiral ridge, which is objectionable, and if the whip is to be made smooth or approximately smooth further treatment is required.

The rubber covering applied by my method without overlapping edges and secured to the core by vulcanization is firmly adherent.

The joint is closed by the vulcanization, so that the covering is seamless, and therefore air and water proof.

The great enemy to rawhide whips is moisture. My seamless rubber coating excludes moisture, and therefore adds to the durability of such whips.

The cause of the deterioration of whalebone whips is largely the drying out of the natural oils from the bone. My covering prevents this evaporation, and therefore improves a whalebone whip.

Rattan whips are often treated with an oily solution to give pliability. My covering protects whips of this character.

While I am aware that attempts have been made to use rubber in various ways in the construction of whips, I am not aware that whips have been made prior to my invention in which the core has been covered with a smooth and uniform layer of rubber, vulcanized on the stock, and so firmly adherent to the core, and the rubber in turn covered with smooth braid or plaiting.

I therefore claim—

A whip having a tapering central core, a layer of rubber of uniform thickness adherent to the central core and vulcanized thereon, and a covering of braid over said rubber, substantially as described.

In testimony whereof I affix my signature in presence of two witnesses.

FRANK GRANT.

Witnesses:
F. K. WARD,
H. J. ENNIS.